United States Patent
Stellwagen

(10) Patent No.: US 9,739,227 B2
(45) Date of Patent: Aug. 22, 2017

(54) CONDENSATION CONTROL SYSTEM FOR ENGINE

(71) Applicant: Caterpillar Energy Solutions GmbH, Mannheim (DE)

(72) Inventor: Karl Stellwagen, Frankenthal (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 136 days.

(21) Appl. No.: 14/791,408

(22) Filed: Jul. 4, 2015

(65) Prior Publication Data

US 2016/0003179 A1   Jan. 7, 2016

(30) Foreign Application Priority Data

Jul. 7, 2014   (EP) .................................. 14175997

(51) Int. Cl.
| | |
|---|---|
| *F02B 29/04* | (2006.01) |
| *F02D 41/14* | (2006.01) |
| *F02D 31/00* | (2006.01) |
| *F02D 41/00* | (2006.01) |
| *F02M 35/10* | (2006.01) |

(52) U.S. Cl.
CPC ........ *F02D 41/144* (2013.01); *F02B 29/0406* (2013.01); *F02B 29/0493* (2013.01); *F02D 31/001* (2013.01); *F02D 41/0007* (2013.01); *F02D 41/1441* (2013.01); *F02D 2041/1472* (2013.01); *F02D 2200/0406* (2013.01); *F02D 2200/0414* (2013.01); *F02D 2200/0418* (2013.01); *F02D 2250/18* (2013.01); *F02M 35/1038* (2013.01); *F02M 35/10393* (2013.01); *Y02T 10/144* (2013.01); *Y02T 10/146* (2013.01)

(58) Field of Classification Search
CPC ............... F02D 41/144; F02D 41/0007; F02D 41/1441; F02D 31/001; F02D 2041/1472; F02D 2200/0406; F02D 2200/0414; F02D 2200/0418; F02D 2250/18; F02B 29/0406; F02B 29/0493; F02M 35/1039; F02M 35/10393; Y02T 10/144
USPC .................... 60/599; 701/701–704, 101–104
See application file for complete search history.

(56) References Cited

U.S. PATENT DOCUMENTS

| | | | |
|---|---|---|---|
| 2,935,978 A | 5/1960 | Kelgard et al. | |
| 6,725,848 B2 * | 4/2004 | Ramamurthy | ........ F02D 41/005 701/108 |

(Continued)

FOREIGN PATENT DOCUMENTS

WO   WO 2010/034045 A1   4/2010

OTHER PUBLICATIONS

European Search Report dated Jan. 20, 2015, in EP Application 14 17 5997 (2 pages).

*Primary Examiner* — Thai Ba Trieu

(57) ABSTRACT

A system for controlling condensation of water within an intake manifold of an engine is disclosed. The system may have a humidity sensor. The humidity sensor may be configured to generate a signal indicative of a humidity of intake air. The system may also have a controller communicably coupled to the humidity sensor. The controller may be configured to receive the signal indicative of the humidity of the intake air. The controller may be also configured to control an operational parameter of at least one of the engine and an engine component to maintain the humidity of the intake air within the intake manifold below a predetermined threshold.

3 Claims, 3 Drawing Sheets

(56) References Cited

U.S. PATENT DOCUMENTS

| | | | |
|---|---|---|---|
| 6,817,197 B1 | 11/2004 | Padfield | |
| 7,292,929 B2 * | 11/2007 | Durand | F02D 41/005 |
| | | | 701/108 |
| 8,543,317 B2 * | 9/2013 | Pasero | F02D 41/005 |
| | | | 701/108 |
| 8,910,476 B2 * | 12/2014 | Nam | F02M 26/46 |
| | | | 701/108 |
| 9,181,859 B2 * | 11/2015 | Glugla | F02B 37/18 |
| 9,228,486 B2 * | 1/2016 | Pursifull | F02D 41/0007 |
| 9,394,839 B2 * | 7/2016 | Pfab | F02B 29/0418 |
| 9,458,760 B2 * | 10/2016 | Morelli | F02B 37/183 |
| 2003/0136390 A1 | 7/2003 | Ramamurthy et al. | |
| 2013/0110376 A1 * | 5/2013 | Surnilla | F02D 41/042 |
| | | | 701/103 |
| 2013/0238218 A1 * | 9/2013 | Wiggins | F02M 35/10393 |
| | | | 701/102 |
| 2014/0149015 A1 * | 5/2014 | Pursifull | F02M 25/06 |
| | | | 701/101 |
| 2014/0158089 A1 * | 6/2014 | Glugla | F02D 41/0007 |
| | | | 123/403 |
| 2014/0316672 A1 * | 10/2014 | Uhrich | F02P 5/045 |
| | | | 701/102 |
| 2014/0316676 A1 * | 10/2014 | Pursifull | F02D 41/222 |
| | | | 701/103 |

* cited by examiner

CONDENSATION CONTROL SYSTEM FOR ENGINE

CLAIM FOR PRIORITY

This application claims benefit of priority of European Patent Application No. 14175997.7, filed Jul. 7, 2014, which is incorporated herein by reference.

TECHNICAL FIELD

The present disclosure relates to condensation control in an engine system, and more specifically to control condensation within an intake manifold of the engine.

BACKGROUND

An internal combustion engine employing a turbocharger may additionally employ an aftercooler arrangement. During high power condition of the engine and high humidity of intake air, moisture present in the intake air may condense within the intake manifold. Further, the condensation of the moisture may occur within the aftercooler itself or downstream of the aftercooler with respect to a flow direction of the intake air in the system.

The condensed moisture may affect the health of one or more engine components. For example, the condensed moisture may mix with depositions present in the engine components and may form unwanted compounds detrimental to health of the engine components. These unwanted compounds may destroy the engine components such as, the aftercooler, mixers, tubes, and other such devices.

Hence, there is a need for a system to control condensation of the moisture within the engine.

SUMMARY OF THE DISCLOSURE

In one aspect of the present disclosure, a system for controlling condensation of water within an intake manifold of an engine is provided. The system includes a humidity sensor configured to generate a signal indicative of a humidity of intake air. The system also includes a controller communicably coupled to the humidity sensor. The controller is configured to receive the signal indicative of the humidity of the intake air. The controller is also configured to control an operational parameter of at least one of the engine and an engine component to maintain the humidity of the intake air within the intake manifold below a predetermined threshold.

In another aspect of the present disclosure, a method for controlling condensation of water within an intake manifold of an engine is provided. The method includes receiving a signal indicative of a humidity of intake air. The method also includes controlling an operational parameter of at least one of the engine and an engine component to maintain the humidity of the intake air within the intake manifold below a predetermined threshold.

Other features and aspects of this disclosure will be apparent from the following description and the accompanying drawings.

DETAILED DESCRIPTION

Figure 1:
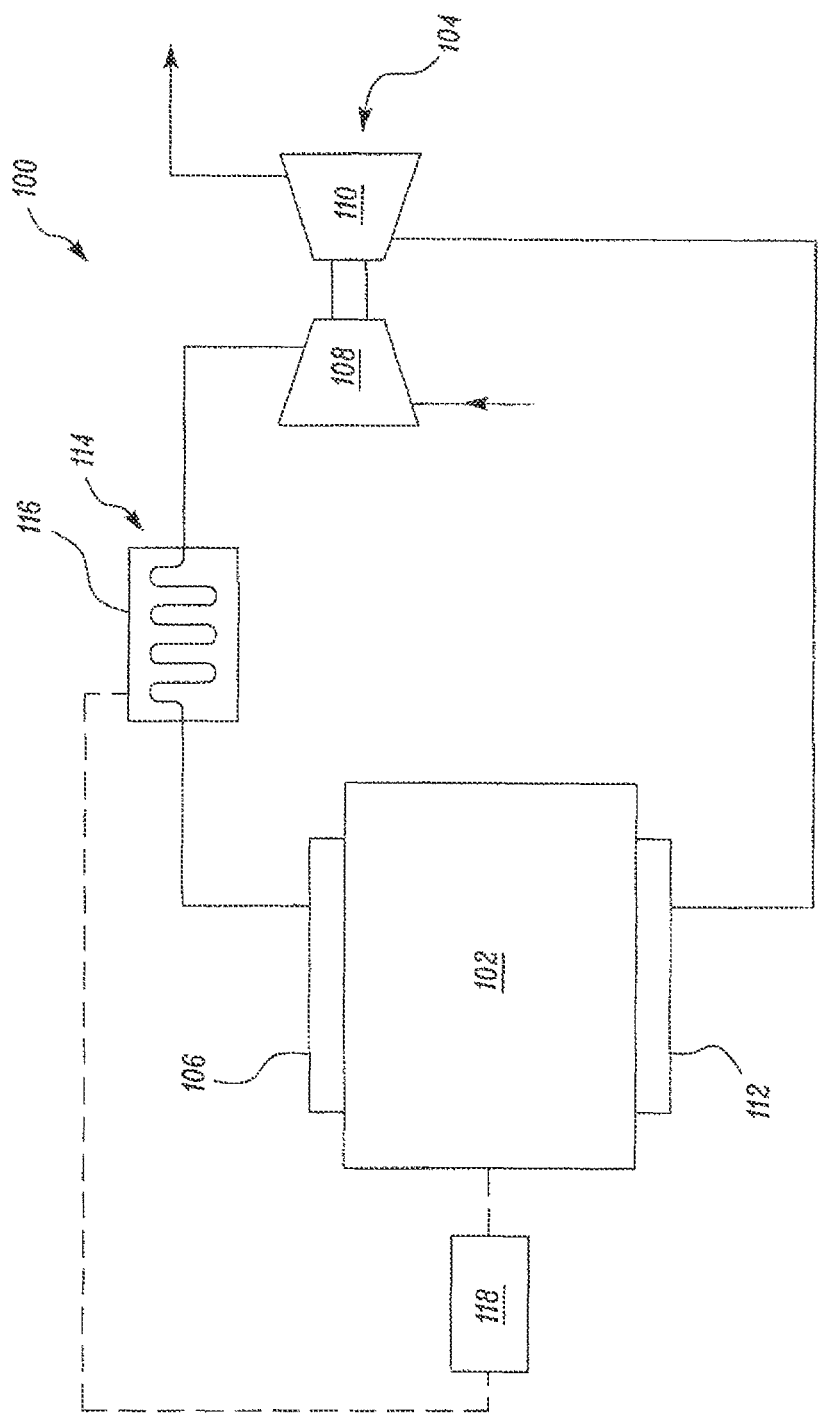
FIG. 1 is a schematic representation of an exemplary engine system, according to an embodiment of the present disclosure.

Wherever possible, the same reference numbers will be used throughout the drawings to refer to the same or the like parts. Referring to FIG. 1, an exemplary engine system 100 is illustrated. The engine system 100 includes an engine 102. The engine 102 is embodied as an internal combustion engine powered by diesel fuel. In other embodiments, the engine 102 may be powered by any other fuel such as, gasoline, natural gas, a combination thereof and so on. In yet other embodiments, the engine 102 may be a gas turbine engine.

The engine system 100 includes a turbocharger 104 provided in fluid communication with the engine 102. More specifically, the turbocharger 104 is provided upstream of the engine 102 with respect to a flow direction of intake air. Further, the turbocharger 104 is provided in fluid communication with an intake manifold 106 associated with the engine 102. The turbocharger 104 includes a compressor 108 drivably coupled to a turbine 110. The turbine 110 is driven by exhaust gas exiting from an exhaust manifold 112 associated with the engine 102 which in turn drives the compressor 108. The compressor 108 is configured to compress and increase a density of the intake air before being supplied to the intake manifold 106.

Further, the engine system 100 includes an engine component 114 such as, an aftercooler 116, provided downstream of the turbocharger 104 with respect to the flow direction of the intake air. The aftercooler 116 is provided in fluid communication with the compressor 108 and the intake manifold 106. The aftercooler 116 is configured to reduce a temperature of the intake air downstream of the compressor 108 before being supplied to the intake manifold 106. In other embodiments, the engine component 114 may be an intercooler (not shown). The intercooler may be provided within the turbocharger 104, and more specifically, between consecutive stages of compression of the intake air. For the purpose of explanation of the disclosure, the engine component 114 considered hereinafter is the aftercooler 116. It should be noted that the disclosure may apply to the intercooler or a combination thereof without any limitations.

The engine system 100 includes a controller 118. The controller 118 may be positioned internal or external to the engine 102. The controller 118 is communicably coupled to the engine 102 and/or the aftercooler 116 and will be explained in detail with reference to FIG. 2. The controller 118 may embody a single microprocessor or multiple microprocessors for receiving signals from components of the condensation control system 200. Numerous commercially available microprocessors may be configured to perform the functions of the controller 118. It should be appreciated that the controller 118 may embody a machine microprocessor capable of controlling numerous machine functions. A person of ordinary skill in the art will appreciate that the controller 118 may additionally include other components and may also perform other functions not described herein.

Figure 2:
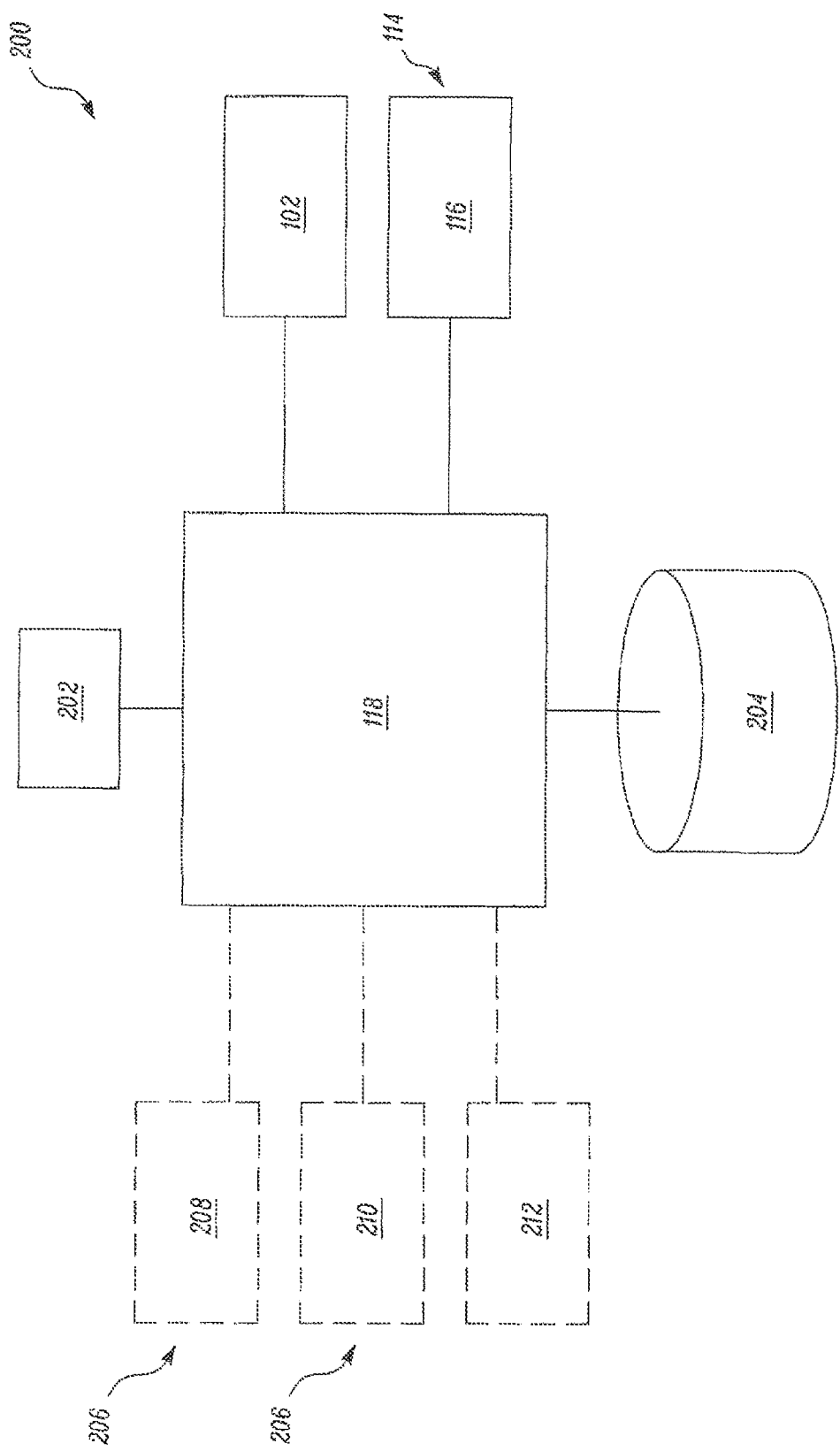
FIG. 2 is a block diagram of a condensation control system, according to an embodiment of the present disclosure.

The present disclosure relates to a condensation control system 200 for the engine 102. Referring to FIG. 2, a block diagram of the condensation control system 200 is illustrated. The condensation control system 200 is configured to control condensation of water within a component associated with the engine 102 such as, the intake manifold 106. The condensation control system 200 includes a humidity sensor 202 associated with the engine 102. The humidity sensor 202 is positioned within the engine 102. More specifically, the humidity sensor 202 is positioned within the intake manifold 106. The humidity sensor 202 is configured to generate a signal indicative of humidity of the intake air within the intake manifold 106. This humidity of the intake air may be an estimate of a relative humidity of the intake present within the intake manifold 106.

The condensation control system 200 includes the controller 118 communicably coupled to the humidity sensor 202. Accordingly, the controller 118 is configured to receive the signal indicative of the humidity of the intake air. Based on the received signal indicative of the humidity of the intake air, the controller 118 is configured to control an operational parameter of at least one of the engine 102 and the aftercooler 116 to maintain the humidity of the intake air within the intake manifold 106 below a predetermined threshold. The predetermined threshold may be a value of a threshold relative humidity. The controller 118 may be configured to retrieve a value of the predetermined threshold by referring to a map or a lookup table stored in a database 204 communicably coupled to the controller 118. In other embodiments, the value of the predetermined threshold may be stored in a memory (not shown) of the controller 118.

For example, when the predetermined threshold may be 100%, the controller 118 may be configured to control the operational parameter of the at least one of the engine 102 and the aftercooler 116 to maintain the humidity of the intake air below 100%. It should be noted that the value of the predetermined threshold described herein is merely exemplary and may vary as per system design and configuration. More specifically, a temperature of the intake air within the intake manifold 106 may be altered to modify the humidity of the intake air.

The operational parameter of the engine 102 may include at least one of a speed of the engine 102 and a power output of the engine 102 such as, a torque output of the engine 102. For example, when the humidity of the intake air within the intake manifold 106 may be approximately equal or higher than the predetermined threshold, the engine 102 may be de-rated to reduce the power output and/or the speed of the engine 102. The de-rating of the engine 102 may reduce a pressure within the intake manifold 106. The reduction of pressure within the intake manifold 106 may in turn lower the humidity of the intake air below the predetermined threshold. Further, the de-rating of the engine 102 may be stopped when the humidity of the intake air within the intake manifold 106 may fall below the predetermined threshold. It should be noted that the operational parameter of the engine 102 may be controlled in numerous ways known to one skilled in the art. The techniques of controlling the operational parameter of the engine 102 described herein are exemplary and do not limit the scope of the disclosure.

The operational parameter of the aftercooler 116 may be at least one of a state of the aftercooler 116 and a temperature of the aftercooler 116. For example, when the humidity of the intake air within the intake manifold 106 may be approximately equal or higher than the predetermined threshold, the aftercooler 116 may be temporarily switched off to raise the temperature of the intake air. Raising the temperature of the intake air may lower the humidity of the intake air. Further, the aftercooler 116 may be switched on when the humidity of the intake air may fall below the predetermined threshold. In other embodiments, the temperature of the aftercooler 116 may be modified in order to change the temperature, and thus the humidity, of the intake air within the intake manifold 106. It should be noted that the aftercooler 116 may be controlled in numerous ways known to one skilled in the art. The techniques of controlling the aftercooler 116 described herein are exemplary and do not limit the scope of the disclosure.

In another configuration of the condensation control system 200, the condensation control system 200 may include at least one intake air parameter sensor 206, hereinafter referred to as the IAP sensor 206. The IAP sensor 206 is configured to generate a signal indicative of at least one parameter of the intake air. The IAP sensor 206 includes a pressure sensor 208. The pressure sensor 208 is positioned within the intake manifold 106 associated with the engine 102. The pressure sensor 208 is configured to generate a signal indicative of a pressure of the intake air within the intake manifold 106.

In other embodiments, the pressure of the intake air within the intake manifold 106 may be determined by the controller 118 from the operational parameters of the engine 102 including, but not limited to, the speed of the engine 102, the power output of the engine 102, and a load on the engine 102. In such a situation, the controller 118 may determine the pressure of the intake air within the intake manifold 106 based on a pre-calibrated data set. The pre-calibrated data set may include a lookup table. The lookup table may be stored in the database 204 communicably coupled to the controller 118 or the memory (not shown) of the controller 118. In other embodiments, the pre-calibrated data set may include a reference map stored in the database 204 or the memory of the controller 118.

The lookup table and/or the reference map may include predetermined readings of the pressure of the intake air within the intake manifold 106 corresponding to different values of the operational parameters of the engine 102. In yet other embodiments, the pre-calibrated data set may be a predetermined mathematical equation, relation, model or known algorithm. For example, a multiple polynomial regression model, a physics based model, a neural network model, any other model or algorithm, or a combination thereof known in the art.

Further, the IAP sensor 206 includes a temperature sensor 210. In one embodiment, the temperature sensor 210 may be positioned at an inlet of the aftercooler 116. Accordingly, the temperature sensor 210 may be configured to generate a signal indicative of a temperature of the intake air prior to entering the aftercooler 116. In another embodiment, the temperature sensor 210 may be positioned at an inlet of the compressor 108 of the turbocharger 104. Accordingly, the temperature sensor 210 may be configured to generate a signal indicative of the temperature of the intake air prior to entering the turbocharger 104.

The condensation control system 200 also includes the humidity sensor 202 associated with the engine 102. The humidity sensor 202 may be positioned at any location within or external to the engine 102 based on the position of the temperature sensor 210. For example, in one embodiment, when the temperature sensor 210 may be positioned at the inlet of the aftercooler 116, the humidity sensor 202 may also be positioned at the inlet of the aftercooler 116. In another embodiment, when the temperature sensor 210 may be positioned at the inlet of the turbocharger 104, the humidity sensor 202 may also be positioned at the inlet of the turbocharger 104. It should be noted that the location of the humidity sensor 202 is merely exemplary and may vary as per system design and configuration. The humidity sensor 202 is configured to generate the signal indicative of humidity of the intake air.

The condensation control system 200 includes an intake manifold temperature sensor 212, hereinafter referred to as the IMT sensor 212. The IMT sensor 212 is positioned within the intake manifold 106. The IMT sensor 212 is configured to generate a signal indicative of a current temperature of the intake air within the intake manifold 106.

The condensation control system 200 includes the controller 118 communicably coupled to the humidity sensor 202, the pressure sensor 208 and the temperature sensor 210. Accordingly, the controller 118 is configured to receive the signal indicative of the humidity, the pressure and the temperature of the intake air respectively.

The controller 118 is further communicably coupled to the IMT sensor 212. Accordingly, the controller 118 is configured to receive the signal indicative of the current temperature of the intake air within the intake manifold 106. It should be noted that in other embodiments, the controller 118 may determine the current temperature of the intake air within the intake manifold 106 by any other methods known in the art. For example, the controller 118 may derive the current temperature of the intake air within the intake manifold 106 from the operational parameters of the engine 102, such as, the speed of the engine 102, the power output of the engine 102, and so on.

In such a situation, the controller 118 may determine the current temperature of the intake air within the intake manifold 106 based on a pre-calibrated data set. The pre-calibrated data set may include a lookup table. The lookup table may be stored in the database 204 communicably coupled to the controller 118 or the memory (not shown) of the controller 118. In other embodiments, the pre-calibrated data set may include a reference map stored in the database 204 or the memory of the controller 118.

The lookup table and/or the reference map may include predetermined readings of the current temperature of the intake air within the intake manifold 106 corresponding to different values of the operational parameters of the engine 102. In yet other embodiments, the pre-calibrated data set may be a predetermined mathematical equation, relation, model or known algorithm. For example, a multiple polynomial regression model, a physics based model, a neural network model, any other model or algorithm, or a combination thereof known in the art.

Based on the received signals, the controller 118 is configured to compare the humidity, the pressure, and the temperature of the intake air with a pre-calibrated dataset. Based, on the comparison, the controller 118 is further configured to determine a predetermined threshold to control the operational parameter of the at least one of the engine 102 and the aftercooler 116. In such a situation, the predetermined threshold is a dew point temperature of the intake air within the intake manifold 106.

In one embodiment, the pre-calibrated data set may include a lookup table. The lookup table may be stored in the database 204 communicably coupled to the controller 118 or a memory (not shown) of the controller 118. In other embodiments, the pre-calibrated data set may include a reference map stored in the database 204 or the memory of the controller 118.

The lookup table and/or the reference map may include predetermined readings of the dew point temperature corresponding to different values of the pressure of the intake air, the temperature of the intake air, and the humidity of the intake air. In yet other embodiments, the pre-calibrated data set may be a predetermined mathematical equation, relation, model or known algorithm. For example, a multiple polynomial regression model, a physics based model, a neural network model, any other model or algorithm, or a combination thereof known in the art.

Based on the determined dew point temperature, the controller 118 is further configured to control the operational parameter of the at least one of the engine 102 and the aftercooler 116 to maintain the current temperature of the intake air within the intake manifold 106 above the dew point temperature. The operational parameter of the engine 102 may include at least one of the speed of the engine 102 and the power output of the engine 102 such as, the torque output of the engine 102. The operational parameter of the aftercooler 116 may be at least one of the state of the aftercooler 116 and the temperature of the aftercooler 116.

For example, when the current temperature of the intake air within the intake manifold 106 may be approximately equal or lower than the dew point temperature, the aftercooler 116 may be temporarily switched off to raise the current temperature of the intake air above the dew point temperature. Further, the aftercooler 116 may be switched on when the current temperature of the intake air may rise above the dew point temperature. In other embodiments, the temperature of the aftercooler 116 may be modified in order to change the current temperature of the intake air within the intake manifold 106. It should be noted that the aftercooler 116 may be controlled in numerous ways known to one skilled in the art. The techniques of controlling the aftercooler 116 described herein are exemplary and do not limit the scope of the disclosure.

In other embodiments, the controller 118 is configured to control the operational parameter of the engine 102 based on a pre-calibrated data set. In one embodiment, the pre-calibrated data set may include a lookup table. The lookup table may be stored in the database 204 communicably coupled to the controller 118 or the memory of the controller 118. Accordingly, the pre-calibrated data set may include a reference map stored in the database 204 or the memory of the controller 118. The lookup table and/or the reference map may include predetermined readings of the operational parameter of the engine 102 corresponding to different values of the current temperature of the intake air within the intake manifold 106.

In yet other embodiments, the pre-calibrated data set may be a predetermined mathematical equation, relation, model or known algorithm. For example, a multiple polynomial regression model, a physics based model, a neural network model, any other model or algorithm, or a combination thereof known in the art. The controller 118 may retrieve the readings from the database 204 and compare the readings with the current temperature within the intake manifold 106 and the dew point temperature in order to control the speed or power output of the engine 102. It should be noted that the methods described herein to maintain the current temperature within the intake manifold 106 above the dew point temperature are exemplary and do not limit the scope of the present disclosure.

INDUSTRIAL APPLICABILITY

The present disclosure relates to controlling condensation of water within the component associated with the engine such as, the intake manifold. The controller may control the operational parameter of the at least one of the engine and the engine component in order to maintain the humidity and/or the current temperature of the intake air within the intake manifold above the predetermined threshold. By maintaining the humidity and/or the current temperature of the intake air within the intake manifold above the predetermined threshold, the quantity of the water present in the intake air that may condense may be decreased, minimized or prevented as the case may be.

Figure 3:
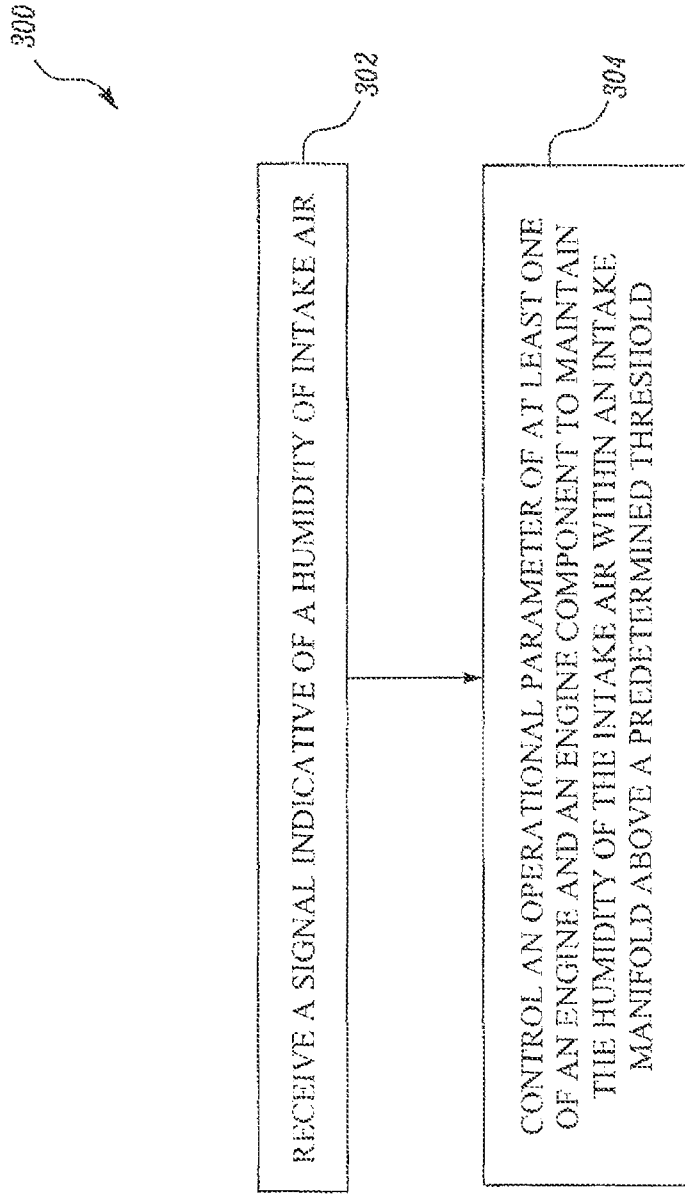
FIG. 3 is a flowchart of a method for operation of the condensation control system, according to an embodiment of the present disclosure.

Referring to FIG. 3, a flowchart of the method 300 is illustrated. At step 302, the controller 118 receives the signal indicative of the humidity of the intake air from the humidity sensor 202. At step 304, based on the received signal, the controller 118 controls the operational parameter of the at least one of the engine 102 and the aftercooler 116 to maintain the humidity of the intake air within the intake manifold 106 above the predetermined threshold. In such a situation, the predetermined threshold is the value of the threshold relative humidity.

The controller 118 controls the operational parameter of the at least one of the engine 102 and the aftercooler 116 based on the pre-calibrated data set. The operational parameter of the engine 102 may include the at least one of the speed of the engine 102 and the power output of the engine 102. The operational parameter of the aftercooler 116 may include at least one of the state of the aftercooler 116 and the temperature of the aftercooler 116.

In other embodiments, along with the signal indicative of the humidity of the intake air, the controller 118 also receives the signal indicative of the pressure of the intake air within the intake manifold 106 from the pressure sensor 208. In other embodiments, the controller 118 may determine the pressure of the intake air within the intake manifold 106 from the operational parameters of the engine 102 including, but not limited to, the speed of the engine 102, the power output of the engine 102 and the load on the engine 102. Also, the controller 118 receives the signal indicative of the temperature of the intake air from the temperature sensor 210.

Further, the controller 118 receives the signal indicative of the current temperature of the intake air within the intake manifold 106 from the IMT sensor 212. In other embodiments, the controller 118 may determine the current temperature of the intake air within the intake manifold 106 from the operational parameters of the engine 102, such as, the speed of the engine 102, the power output of the engine 102, and so on.

Based on the received signals, the controller 118 compares the humidity, the temperature, and the pressure of the intake air with the pre-calibrated data set. Based on the comparison, the controller 118 determines the predetermined threshold to control the operational parameter of at least one of the engine 102 and the engine component 114. The engine component 114 may be at least one of the aftercooler 116 and the intercooler. In such a situation, the predetermine threshold is the dew point temperature of the intake air within the intake manifold 106.

Based on the determined dew point temperature, the controller 118 controls the operational parameter of the engine 102 and/or the aftercooler 116 to maintain the current temperature of the intake air within the intake manifold 106 above the dew point temperature based on the pre-calibrated dataset. The operational parameter of the engine 102 may include at least one of the speed of the engine 102 and the power output of the engine 102. The operational parameter of the aftercooler 116 may be at least one of the state of the aftercooler 116 and the temperature of the aftercooler 116.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system for controlling condensation of water within an intake manifold of an engine, the system comprising:
   a humidity sensor configured to generate a signal indicative of a humidity of the intake air in the intake manifold;
   a temperature sensor configured to generate a signal indicative of the temperature of the intake air in the intake manifold; and
   a controller communicably coupled to the humidity sensor, the temperature sensor, the engine, and an aftercooler associated with the engine, the controller configured to:
      receive the signal indicative of the humidity of the intake air;
      receive the signal indicative of the temperature of the intake air;
      determine a pressure of the intake air within the intake manifold;
      compare the humidity, the temperature, and the pressure of the intake air with a pre-calibrated data set to obtain a predetermined threshold; and
      control an operational parameter of at least one of the engine and the aftercooler to maintain the humidity of the intake air within the intake manifold below the predetermined threshold.

2. The system of claim 1, further comprising:
   a pressure sensor configured to generate a signal indicative of the pressure of the intake air within the intake manifold.

3. The system of claim 1, wherein the controller is further configured to:
   receive a signal indicative of a load on the engine for determining the pressure of the intake air within the intake manifold.

* * * * *